United States Patent
Ridley

(10) Patent No.: US 10,241,238 B2
(45) Date of Patent: Mar. 26, 2019

(54) CORROSION RESISTANT OPTICAL DEVICE

(71) Applicant: Materion Corporation, Mayfield Heights, OH (US)

(72) Inventor: Jason I. Ridley, Mayfield Heights, OH (US)

(73) Assignee: MATERION CORPORATION, Mayfield Heights, OH (US)

( * ) Notice: Subject to any disclaimer, the term of this patent is extended or adjusted under 35 U.S.C. 154(b) by 194 days.

(21) Appl. No.: 15/295,107

(22) Filed: Oct. 17, 2016

(65) Prior Publication Data

US 2017/0108625 A1  Apr. 20, 2017

Related U.S. Application Data

(60) Provisional application No. 62/243,247, filed on Oct. 19, 2015.

(51) Int. Cl.
*G02B 1/18* (2015.01)
*G02B 1/14* (2015.01)
(Continued)

(52) U.S. Cl.
CPC ............... *G02B 1/18* (2015.01); *B05D 1/18* (2013.01); *B05D 1/185* (2013.01); *B32B 15/00* (2013.01); *B32B 15/018* (2013.01); *B32B 15/04* (2013.01); *B32B 15/08* (2013.01); *B32B 17/00* (2013.01); *B32B 17/06* (2013.01); *C03C 17/00* (2013.01); *C03C 17/06* (2013.01); *C03C 17/28* (2013.01);
(Continued)

(58) Field of Classification Search
CPC ... G02B 1/14; G02B 5/08; G02B 1/18; G02B 1/10; G02B 5/0808; B05D 1/18; B05D 1/185; C03C 17/00; C03C 17/06; C03C 17/28; C23C 30/00; C23C 30/005; B32B 15/00; B32B 15/018; B32B 15/04; B32B 15/08; B32B 17/00; B32B 17/06; Y10T 428/12896; Y10T 428/12993; Y10T 428/12597; Y10T 428/12604; Y10T 428/12556; Y10T 428/315
See application file for complete search history.

(56) References Cited

U.S. PATENT DOCUMENTS

| 4,357,396 A | 11/1982 | Grunewalder et al. |
| 2013/0279001 A1 | 10/2013 | Mochizuki |
| 2015/0369974 A1* | 12/2015 | Tominaga ............ G02B 5/085 359/360 |

FOREIGN PATENT DOCUMENTS

| FR | 2 980 216 A1 | 3/2013 |
| WO | WO2013/041799 | * 3/2013 |
| WO | WO 2014/129275 A1 | 8/2014 |

OTHER PUBLICATIONS

Machine Translation, Tominaga et al., WO 2014/129275, Aug. 2014. (Year: 2014).*

(Continued)

*Primary Examiner* — Michael E. La Villa
(74) *Attorney, Agent, or Firm* — Fay Sharpe LLP

(57) ABSTRACT

A corrosion-resistant optical device is disclosed. The device includes a substrate, a silver layer upon the substrate, and an insulating layer that provides abrasion resistance. The device is immersed in a thiol-rich solution. The thiols form a corrosion-inhibiting monolayer upon any exposed silver surface. This increases the environmental resistance of the optical device, keeping water from interacting with the silver layer.

15 Claims, 2 Drawing Sheets

(51) Int. Cl.
- B05D 1/18 (2006.01)
- B32B 15/04 (2006.01)
- G02B 1/10 (2015.01)
- B32B 15/00 (2006.01)
- C03C 17/00 (2006.01)
- C23C 30/00 (2006.01)
- C03C 17/06 (2006.01)
- B32B 15/01 (2006.01)
- C03C 17/28 (2006.01)
- B32B 15/08 (2006.01)
- B32B 17/06 (2006.01)
- B32B 17/00 (2006.01)
- G02B 5/08 (2006.01)

(52) U.S. Cl.
CPC ............ *C23C 30/00* (2013.01); *C23C 30/005* (2013.01); *G02B 1/10* (2013.01); *G02B 1/14* (2015.01); *G02B 5/0808* (2013.01); *G02B 5/08* (2013.01); *Y10T 428/12556* (2015.01); *Y10T 428/12597* (2015.01); *Y10T 428/12604* (2015.01); *Y10T 428/12896* (2015.01); *Y10T 428/12993* (2015.01); *Y10T 428/315* (2015.01)

(56) References Cited

OTHER PUBLICATIONS

Machine Translation, Leyder et al., WO 2013/041799, Mar. 2013. (Year: 2013).*

International Search Report for International Application No. PCT/US2016/057306 dated Feb. 10, 2017.

Liang et al.; Tarnish protection of silver by octadecanethiol self-assembled monolayers prepared in aqueous micellar solution; Surface & Coatings Technology; 203; pp. 1034-1044; 2009.

Love et al.; Self-Assembled Monolayers of Thiolates on Metals as a Form of Nanotechnology; Chemical Reviews; 105; pp. 1103-1169; 2005.

\* cited by examiner

CORROSION RESISTANT OPTICAL DEVICE

RELATED APPLICATIONS

This application claims priority to U.S. Provisional Patent Application Ser. No. 62/243,247 filed Oct. 19, 2015.

BACKGROUND

The present disclosure relates to optical devices to which a corrosion-inhibiting monolayer has been applied for the purpose of protecting the silver surface(s) of the device. Also disclosed are methods for producing such devices.

Optical coatings are layers of material deposited on optical components, such as lenses or mirrors, which alter the way in which the optical component reflects and transmits light. Thus optical coatings are used in a wide range of optical applications, such as astronomy, still and video cameras and other imaging devices, televisions, computer monitors, cellular telephone screens and other display devices, optical sensors such as motion sensors, gesture sensors, and the like. Depending on the application, the coatings can vary in thickness and design.

Silver has shown to have superior reflective properties in the visible spectrum, particularly when compared to gold. However, silver is generally avoided in high precision imaging applications due to its inferior environmental resistance and its softness. For example, sulfidation of silver by sulfur-containing gases trapped in humid air has been well-documented by the scientific community.

Dielectric layers are sometimes applied over top of metal films, either functioning as protective layers that increase abrasion resistance, or to enhance the reflectivity of the metal films. Metal and dielectric combinations are also used to make advanced coatings tailored in sensitivity to wavelength, angle and polarization. The overall reflectivity and transmissive capability of the optical device may be tailored based on composition, thickness and number of layers. However, defect sites in these protective layers, such as pinholes, can serve as entry points for sulfidative compounds that can attack silver. It would be desirable to develop coatings that reduce sulfidation and other adverse effects resulting from imperfect and/or perforated dielectric layers, and to provide methods for applying such coatings to optical devices.

BRIEF DESCRIPTION

The present disclosure is directed to optical devices having a corrosion-inhibiting monolayer, particularly monolayers derived from hydrophobic thiols, which preferentially adsorb to silver. Also included are processes for applying the monolayers to surface(s) of a substrate.

In this regard, disclosed in various embodiments herein are corrosion resistant optical devices comprising: a substrate; an insulating layer; a silver layer located between the substrate and the insulating layer; and a corrosion-inhibiting monolayer covering at least a portion of any exposed surface of the silver layer.

The corrosion-inhibiting monolayer may be formed from at least one hydrophobic thiol. In particular embodiments, the hydrophobic thiol is of the formula R—SH, wherein R is an alkyl group containing from about 1 carbon atoms to about 24 carbon atoms.

The optical device may further comprise a binding layer between the insulating layer and the silver layer. The optical device may further comprise an alloy layer between the silver layer and the substrate. The alloy layer may be in direct contact with the substrate. The alloy layer can be formed from a nickel-chromium alloy.

In some embodiments, the corrosion-inhibiting monolayer is applied directly to the insulating layer. The corrosion-inhibiting monolayer can be applied to the insulating layer by immersing the insulating layer in a thiol-rich solution. The insulating layer may be immersed for a period of about 4 hours to about 36 hours. In particular embodiments, the corrosion-inhibiting monolayer is made from a solution comprising an alkanethiol and an alcohol solvent.

Also disclosed herein are methods for forming a corrosion-resistant optical device, comprising: forming a silver layer upon the substrate; forming an insulating layer upon the silver layer to obtain a layered substrate; and immersing the layered substrate in a thiol-rich solution to form a corrosion-inhibiting monolayer covering at least a portion of any exposed surface of the silver layer.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
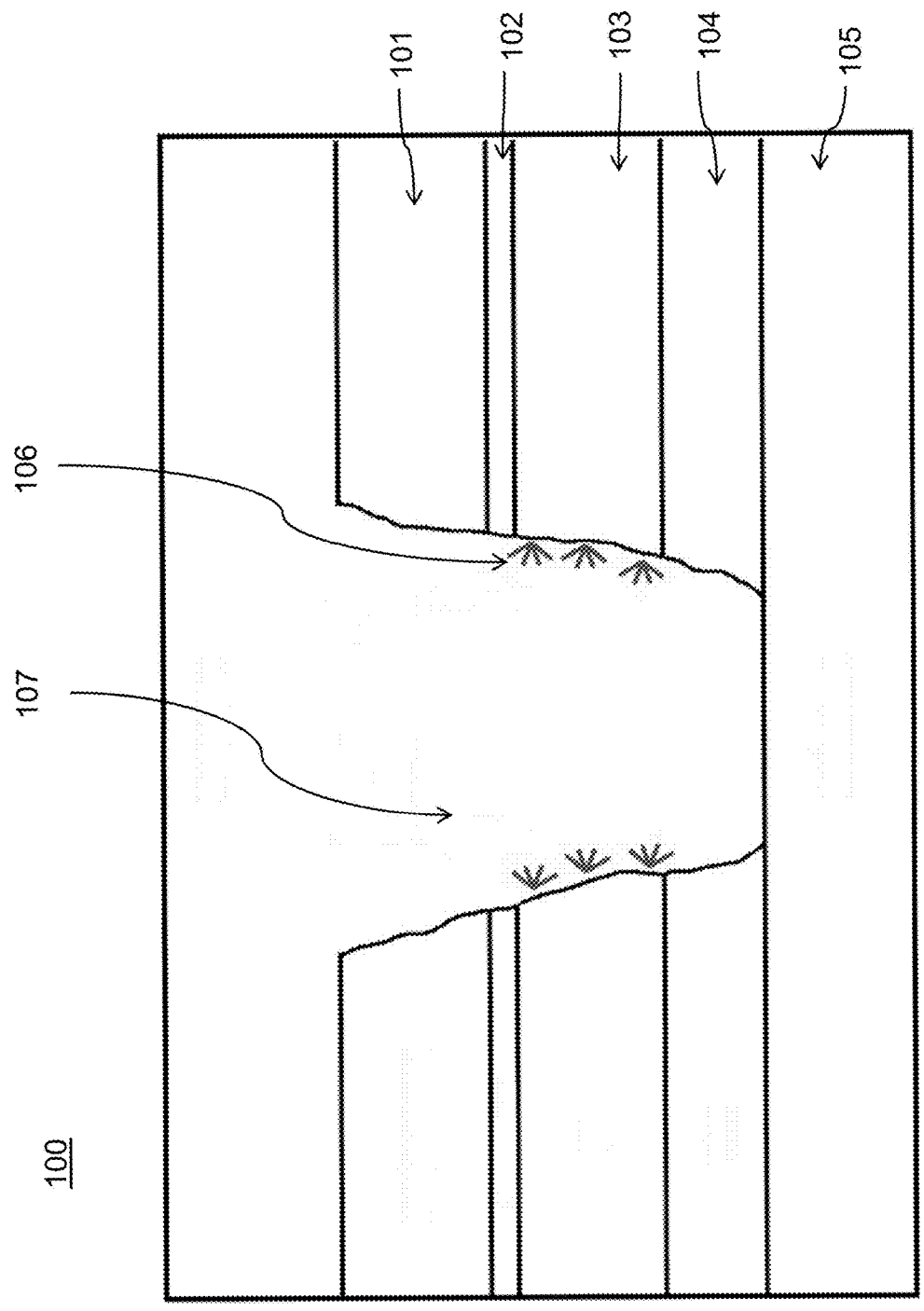
FIG. 1 is a cross-sectional view of an exemplary optic with an insulating layer, a layer of silver, and a pinhole defect.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing compositions or processes as "consisting of" and "consisting essentially of" the enumerated components/steps, which allows the presence of only the named components/steps, along with any impurities that might result therefrom, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

The present disclosure may refer to temperatures for certain process steps. It is noted that these generally refer to the temperature at which the heat source (e.g. furnace, oven) is set, and do not necessarily refer to the temperature which must be attained by the material being exposed to the heat.

As used in the specification and claims, the term "metal" refers to a relatively pure elemental metal (i.e., a metal containing a single element and impurities) or an alloy of two or more elements.

The present disclosure will refer to a first layer being formed upon a second layer. The term "on" or "onto" or "upon" refers to the second layer as being the bottom or support for the first layer which is on top of it. The first layer may be "upon" the second layer even though they do not directly contact each other, for example if a third layer is located between the first and second layers.

The present disclosure relates to methods of protecting silver coatings/films/layers that are also protected by a dielectric overcoat. Even with a protective overcoat layer, defect sites like pinholes can serve as an entry point for sulfidative compounds. The silver-coated optical device can be immersed in a thiol-rich solution. The thiol preferentially adsorbs to silver, which should only be exposed at defect sites. The hydrophobic tail of the thiol keeps water from interacting with the silver layer.

FIG. 1 is a cross-sectional view of a conventional optical device 100. At its most general level, the device has a substrate 105, upon which a silver layer 103 is formed. An insulating layer 101 is then formed upon the silver layer 103. As shown here, the insulating layer 101 may be directly applied to a binding layer 102 so as to be in complete physical contact with the binding layer, providing an impermeable layer from the external environment. The binding layer 102 is also in complete physical contact with the silver layer 103, which in turn is in complete physical contact with an alloy coating 104. The alloy coating is directly applied to the substrate 105, so as to be in complete physical contact with substrate 105. A pinhole defect 107 is illustrated here as extending through the insulating layer 101, binding layer 102, silver layer 103, and alloy layer 104 such that the upper surface of the substrate 105 is exposed. The exposed portions/surfaces of the silver layer 103 within the pinhole defect 107 are marked with arrows and reference numeral 106. It should be noted that a pinhole defect does not need to extend through all layers of the optical device 100; it would be sufficient to expose the silver layer 103 if the pinhole extended only through the insulating layer 101 and the binding layer 102.

Figure 2:
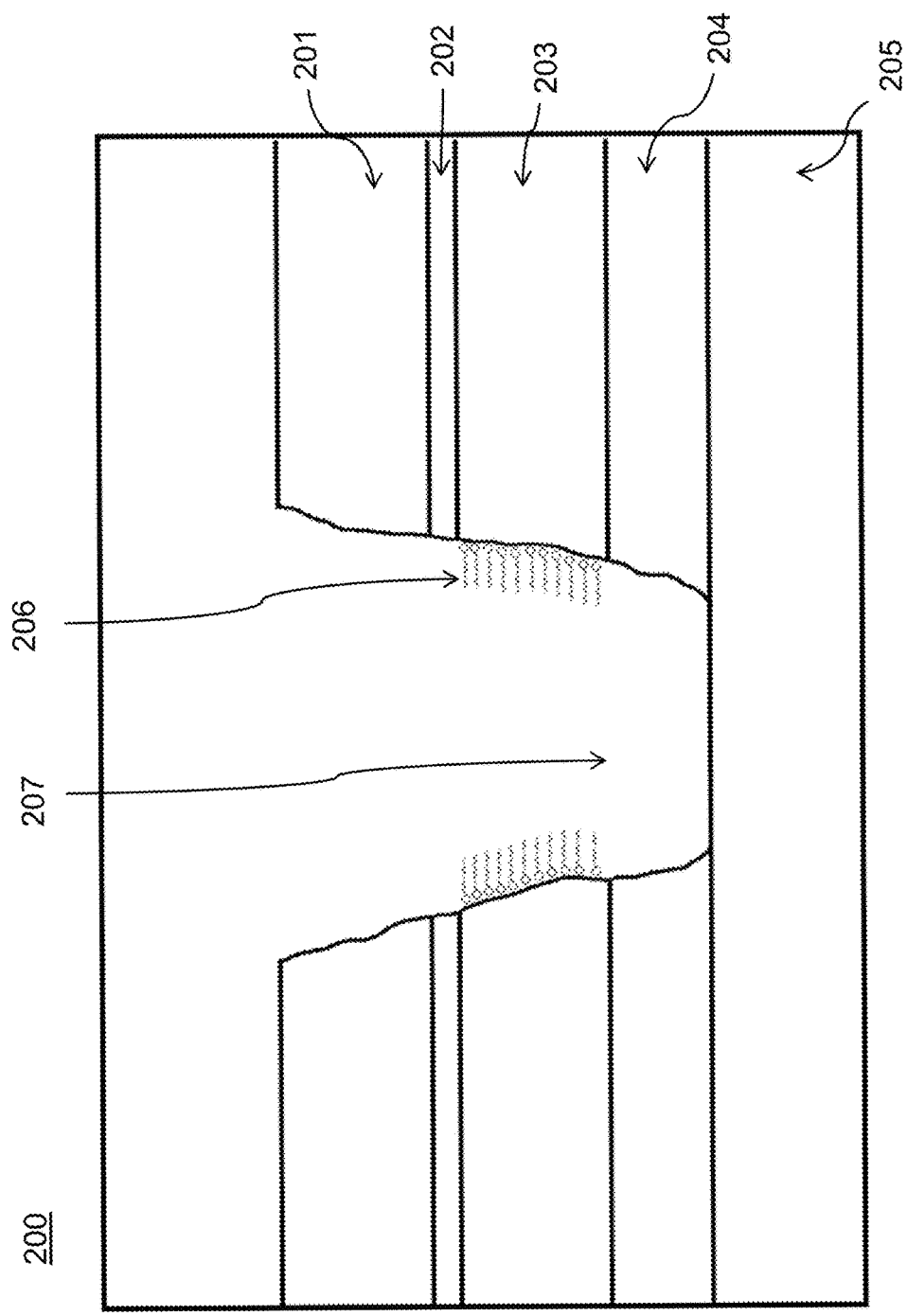
FIG. 2 is a cross-sectional view of an exemplary optic with an insulating layer, a silver layer, a pinhole defect, and an applied monolayer of a hydrophobic thiol.

FIG. 2 is a cross-sectional view of an exemplary optical device 200. Like the device depicted in FIG. 1, the cross-section of FIG. 2 depicts an insulating layer 201 layered directly onto a binding layer 202. The binding layer 202 is directly layered onto a silver layer 203, which is in turn directly layered onto an alloy coating or layer 204. The alloy layer 204 is directly layered onto a substrate 205. The pinhole defect 207 again exposes portions of the silver layer 203. In this figure, however, a hydrophobic thiol monolayer 206 has been applied. The hydrophilic end groups of the thiol adsorb to the exposed silver, and the hydrophobic end groups of the thiol extend into the pinhole defect 207. The hydrophobic end groups significantly reduce interaction of the exposed silver with water and other aqueous solutions, and act as a corrosion-inhibiting monolayer. It is noted that the thiol monolayer/corrosion-inhibiting monolayer desirably covers all of the exposed surfaces of the silver layer, but it is contemplated that the monolayer can be applied to cover just a portion of any given exposed surface of the silver layer, or just some of the exposed surfaces of the silver layer.

At least one hydrophobic thiol is present in the monolayer 206. Generally, the hydrophobic thiol is a compound of the formula R—SH, wherein R is an alkyl group containing from about 1 carbon atom to about 24 carbon atoms. In particular embodiments, the thiol used to form the monolayer is 1-octadecanethiol, which adheres particularly well to silver. The thiol is mixed with an alcohol solvent, such as ethanol, to form a thiol-rich solution. The monolayer is then formed by immersing the optical device in the thiol-rich solution of ethanol for a period of about 4 hours to about 36 hours, including a period of about 24 hours.

The insulating layer 101/201 may be a dielectric coating that serves as an insulative/protective layer for a silver coating or layer. The dielectric layer generally can be an inorganic material film, an organic polymer film, or an organic-inorganic composite film. Examples of inorganic materials suitable as the dielectric layer include silicon oxide, silicon nitride, aluminum oxide, barium titanate, barium zirconium titanate and the like. Examples of suitable organic polymers include polyesters, polycarbonates, poly (vinyl phenol), polyimides, polystyrene, polymethacrylates, polyacrylates, epoxy resin and the like. The thickness of the dielectric layer depends on the dielectric constant of the material used and can be, for example, from about 10 nanometers to about 500 nanometers. The dielectric layer may have a conductivity that is, for example, less than about 10-12 Siemens per centimeter (S/cm). The dielectric layer is formed using conventional processes known in the art.

The alloy layer 104/204 may be a metallic alloy. In particular embodiments, the alloy is a nickel-chromium alloy. In other embodiments, the alloy may be any one of nickel, chromium, iron, aluminum, steel, zinc or any other material known and applied in the art.

The substrate 105/205 of the imaging member may be opaque or substantially transparent and may comprise any suitable material having the required mechanical properties. For example, the substrate may comprise a layer of an electrically non-conductive, semiconductive, or conductive material such as an inorganic or an organic composition. Various resins may be employed as non-conductive materials including polyimides, polyesters, polycarbonates, polyamides, polyurethanes, and the like, which are flexible as thin webs.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A corrosion resistant optical device comprising:
a substrate;
an insulating layer; and
a silver layer located between the substrate and the insulating layer;
wherein a pinhole defect extends through the insulating layer to expose a portion of the silver layer; and
a corrosion-inhibiting monolayer formed from a hydrophobic thiol of the formula R—SH, wherein R is an alkyl group containing from 1 carbon atom to 24 carbon atoms;
wherein the corrosion-inhibiting monolayer is formed on the exposed portion of the silver layer by applying a solution containing the hydrophobic thiol to the insulating layer.

2. The optical device of claim 1, further comprising a binding layer between the insulating layer and the silver layer, wherein the pinhole defect extends through the binding layer.

3. The optical device of claim 1, further comprising an alloy layer between the silver layer and the substrate.

4. The optical device of claim 3, wherein the alloy layer is in direct contact with the substrate.

5. The optical device of claim 3, wherein the alloy layer is formed from a nickel-chromium alloy.

6. The optical device of claim 1, wherein the corrosion-inhibiting monolayer is formed by immersing the insulating layer in a thiol-rich solution.

7. The optical device of claim 6, wherein the insulating layer is immersed for a period of about 4 hours to about 36 hours.

8. The optical device of claim 1, wherein the solution further comprises and an alcohol solvent.

9. The optical device of claim 1, wherein the corrosion-inhibiting monolayer covers all exposed surfaces of the silver layer.

10. A method for forming a corrosion-resistant optical device, comprising:
forming a silver layer upon the substrate;
forming an insulating layer upon the silver layer to obtain a layered substrate; and
immersing the layered substrate in a thiol-rich solution to form a corrosion-inhibiting monolayer that covers at least a portion of any pinhole defect, said pinhole defect comprising an exposed surface of the silver layer.

11. The method of claim 10, wherein the layered substrate is immersed for a period of about 4 hours to about 36 hours.

12. The method of claim 10, wherein the thiol-rich solution contains at least one hydrophobic thiol.

13. The method of claim 12, wherein the at least one hydrophobic thiol is of the formula R—SH, wherein R is an alkyl group containing from 1 to 24 carbon atoms.

14. The method of claim 10, wherein the thiol-rich solution comprises an alkanethiol and an alcohol solvent.

15. The corrosion-resistant optical device formed by the method of claim 10.

* * * * *